United States Patent
Sapsford et al.

(10) Patent No.: US 7,519,700 B1
(45) Date of Patent: Apr. 14, 2009

(54) METHOD AND SYSTEM FOR TOPOLOGICAL NAVIGATION OF HIERARCHICAL DATA GROUPS

(75) Inventors: Joe Sapsford, Belmont, CA (US); Han Wen, San Jose, CA (US)

(73) Assignee: OPNET Technologies, Inc., Bethesda, MD (US)

( * ) Notice: Subject to any disclaimer, the term of this patent is extended or adjusted under 35 U.S.C. 154(b) by 800 days.

(21) Appl. No.: 11/061,978

(22) Filed: Feb. 18, 2005

(51) Int. Cl.
    *G06F 15/173* (2006.01)
(52) U.S. Cl. ............... 709/223; 709/224; 715/735; 715/736
(58) Field of Classification Search ......... 709/223–224; 715/735, 736
    See application file for complete search history.

(56) References Cited

U.S. PATENT DOCUMENTS

| | | | |
|---|---|---|---|
| 6,229,540 B1 * | 5/2001 | Tonelli et al. | 715/735 |
| 6,393,472 B1 * | 5/2002 | Anerousis et al. | 709/223 |
| 6,407,751 B1 * | 6/2002 | Minami et al. | 715/736 |
| 6,697,087 B1 * | 2/2004 | Kelly | 715/735 |
| 6,727,927 B1 * | 4/2004 | Dempski et al. | 715/853 |
| 7,327,998 B2 * | 2/2008 | Kumar et al. | 709/224 |
| 2003/0009547 A1 * | 1/2003 | Benfield et al. | 709/223 |
| 2004/0015579 A1 * | 1/2004 | Cooper et al. | 709/223 |
| 2004/0107277 A1 * | 6/2004 | Levesque et al. | 709/223 |
| 2006/0075094 A1 * | 4/2006 | Wen et al. | 709/224 |

* cited by examiner

*Primary Examiner*—Phuoc Nguyen

(57) ABSTRACT

A system and method to visually navigate hierarchical data groups are provided. If a user wishes to graphically view network traffic for a particular business group of network nodes, a network topology navigation tool may be provided to display to the user such information that is relevant to the selected business group and the corresponding hierarchy level. The user may also be permitted to access more detailed connection information through appropriate drill-downs.

30 Claims, 9 Drawing Sheets

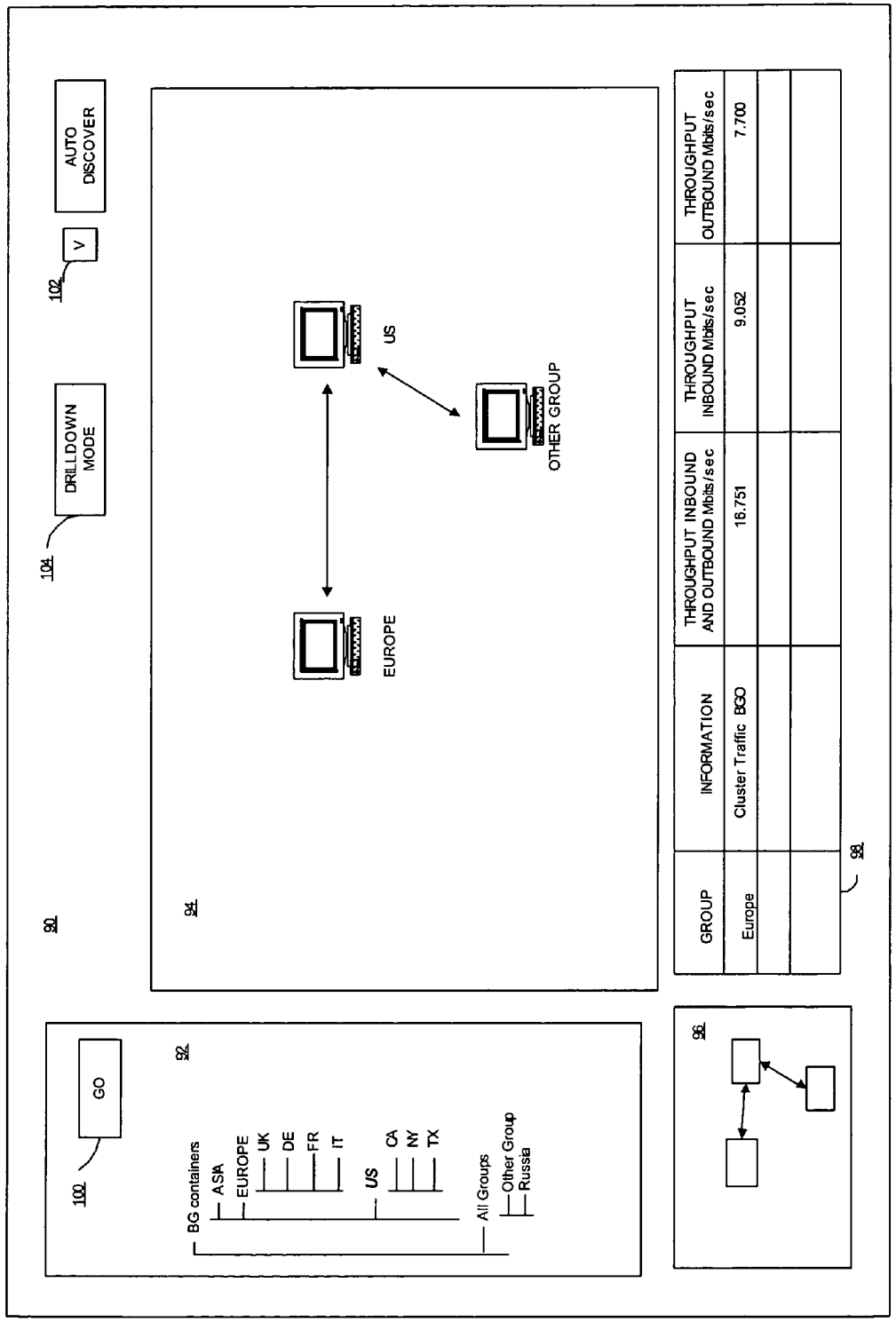
FIGURE 4A (NO DRILLDOWN)

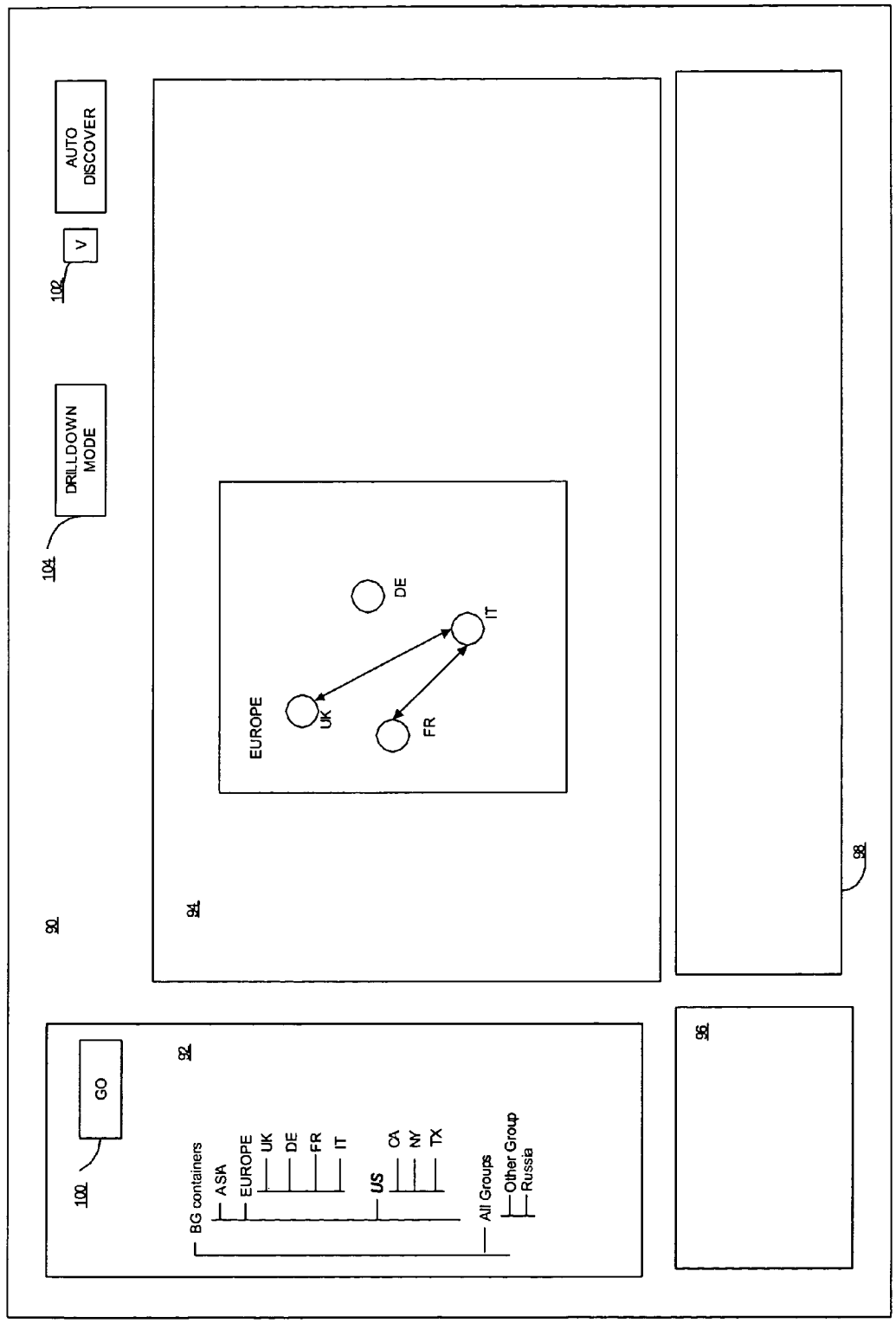
FIGURE 4B (MEMBER DISCOVERY DRILLDOWN MODE)

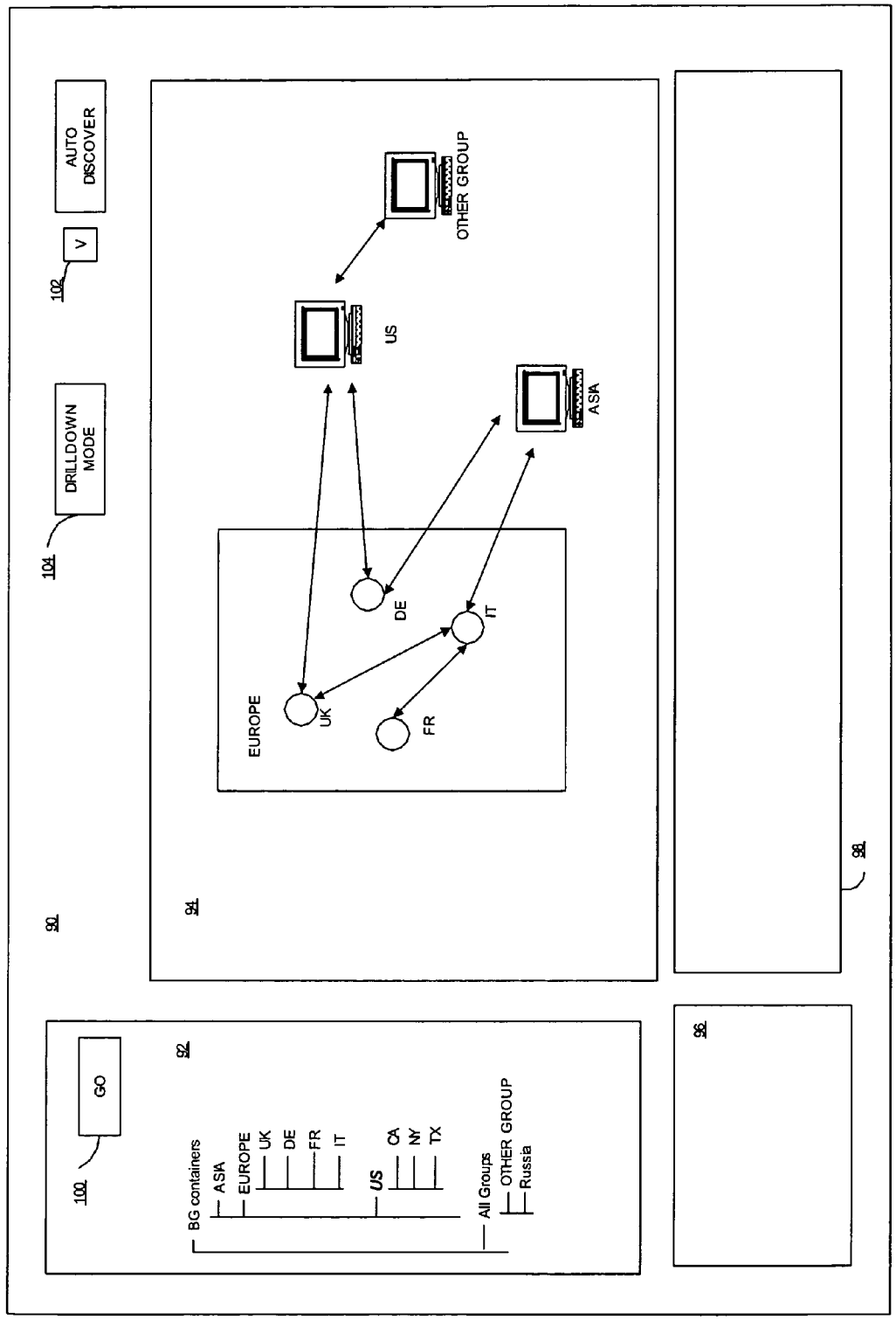
FIGURE 4C (FULL MEMBER TO CONNECTED GROUPS DISCOVERY DRILLDOWN MODE)

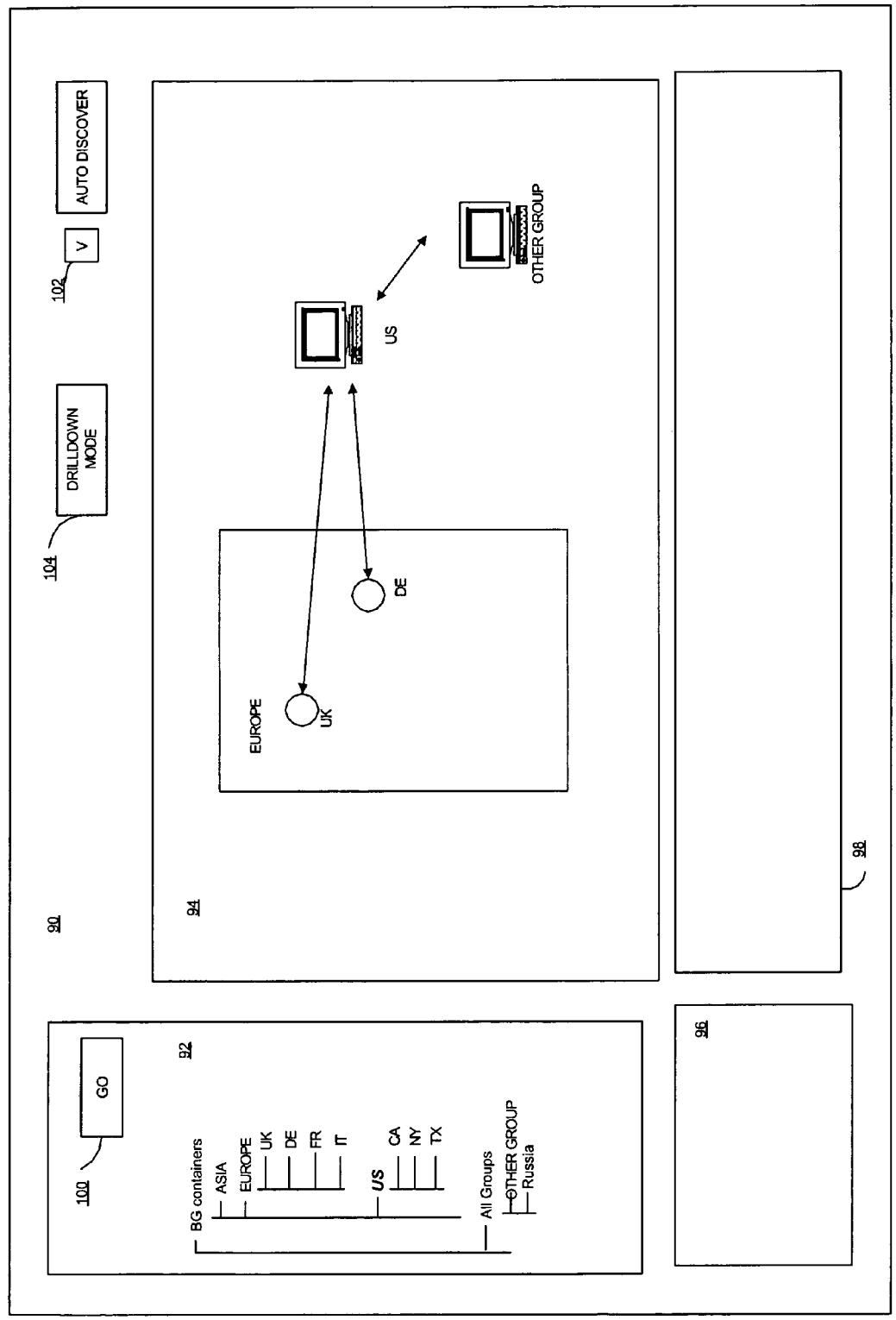
FIGURE 4D (LIMITED MEMBER TO CONNECTED GROUPS DISCOVERY DRILLDOWN MODE)

METHOD AND SYSTEM FOR TOPOLOGICAL NAVIGATION OF HIERARCHICAL DATA GROUPS

FIELD OF THE INVENTION

The present invention generally pertains to the field of monitoring computer networks. Specifically, the present invention pertains to the field of topological navigation of hierarchical data groups.

BACKGROUND

One of the challenges in modern enterprise networks is monitoring network traffic across nodes that simultaneously play multiple diverse roles within the network. Examples of network nodes include an employee's personal computer, an email server, a web application server, a database server, and a file server. The applications running on these nodes use the IP Protocol layer to establish inter-nodal connections for communication and information transfer.

Each IP connection consists of a client (typically the node that initiates the connection) and a server. Networked nodes may concurrently act as both a client and a server, depending on the applications they run. For example, a personal computer node can act as a client, by browsing and downloading web pages, at the same time as it is acting as a server, by sending email attachments. A web application server can act as a client by requesting information from a database server, while it also performs its function as a server in responding to application requests by clients that connect with it. Furthermore, while nodes are acting as both a server and client, they are often members of one or more logical groups.

Traditional network monitoring solutions group network traffic according to whether a network node is a client or a server. Useful metrics such as total throughput for the node disregard whether the node is acting as a server or a client. Other metrics, such as total response time, requests served, and connections established require knowledge of whether the node is acting as a client or a server but are more meaningful when aggregated with other node metrics. However, information at the individual node level in a large network comprises information at thousands of nodes, which may clutter the display area and make it harder for a user to pinpoint the information the user is particularly interested in. Providing network performance data graphically in a streamlined manner may enhance user experience and improve usability of network monitoring tools.

SUMMARY OF THE INVENTION

A method and system for topological navigation of hierarchical data groups are described. In one embodiment, the system includes an extractor configured to receive a request to retrieve network traffic information relating to logical groups of network nodes connected to a selected logical group of such nodes having a selected level of hierarchy; and a topology tool configured to retrieve information from those ones of the connected logical groups relevant to the selected level of hierarchy.

Other features of the present invention will be apparent from the accompanying drawings and from the detailed description, which follows.

BRIEF DESCRIPTION OF THE DRAWINGS

The present invention is illustrated by way of example, and not limitation, in the figures of the accompanying drawings in which:

FIGS. 4A-4D show a network performance management console to graphically navigate hierarchical business groups, according to one exemplary embodiment of the present invention.

DETAILED DESCRIPTION

Figure 1A:
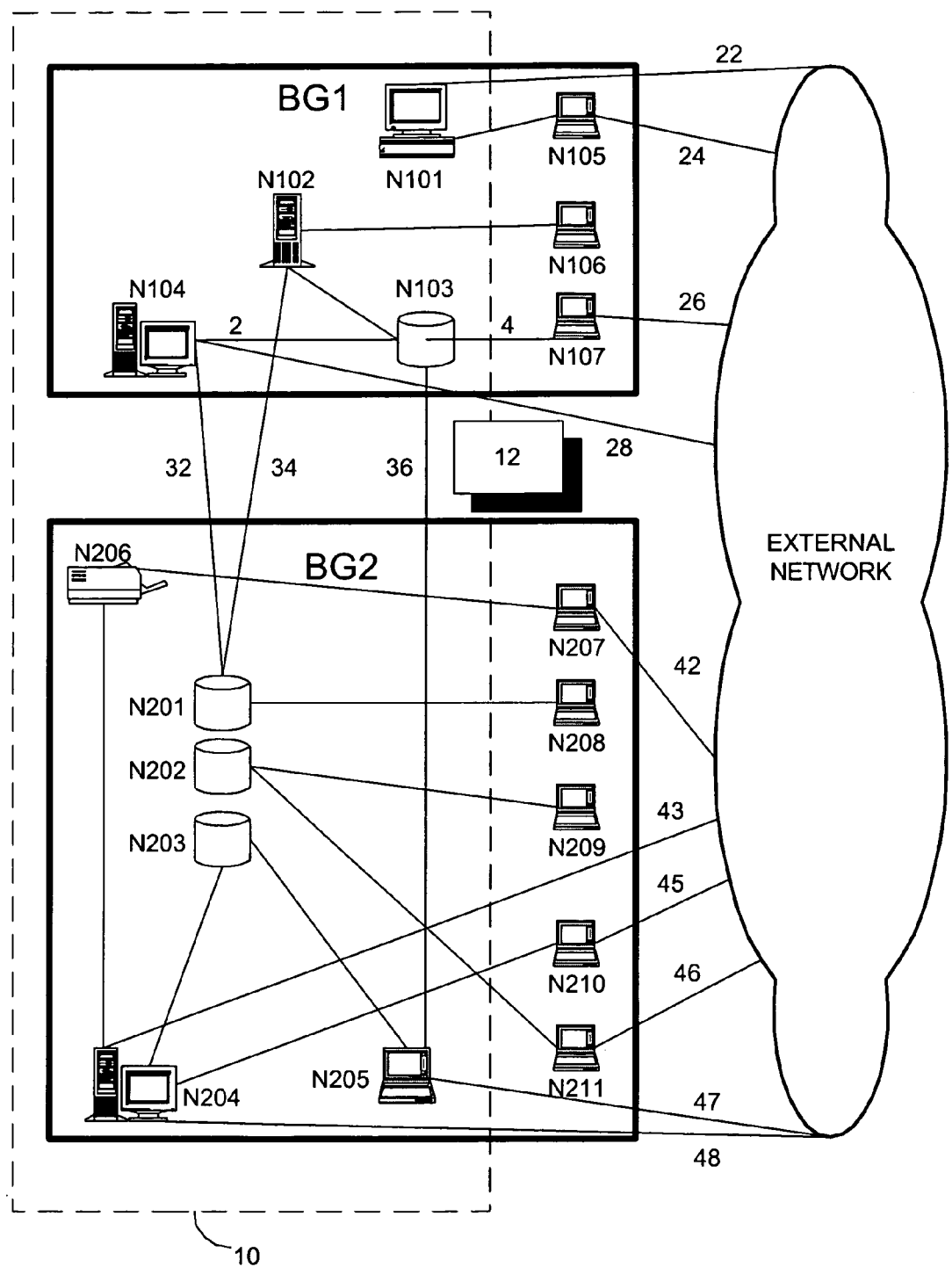
FIGS. 1A-1B show a diagrammatic representation of exemplary groups of networked nodes and data flows between the nodes and the external network.

Network traffic data regarding a number of network nodes may be collected for individual network nodes, as well as for groups or collections of network nodes. For example, network nodes may be combined into logical groupings (e.g., business groups) according to their IP addresses. A business group of network nodes (BG) may include one or more IP addresses or one or more ranges of IP addresses. Business groups can also be allocated to business group containers. A user may designate one or more business groups to be included in a container. For example, "CA" and "FL" business groups may be defined as members of the "US" container. On the other hand a business group (e.g., "CA") may itself be designated as a container and include its own member business groups, such as "SFO", "SJC," and "LAX." Thus, business groups and containers may be organized in a hierarchy (e.g. US∵CA∵SFO), which may be referred to as a BG container hierarchy. A BG container hierarchy may be defined by a user, stored in a database, and managed via a user interface (referred to as the management console).

Network traffic and performance data may be collected by an appliance configured for such purpose. Network traffic between business groups and between containers may be derived from traffic between their respective member business groups. For example, traffic between containers CA and FL may be derived from traffic between CA member business groups (e.g., LAX, SFO, and SJC) and FL member business groups (e.g., MIA, TPA, and ORL). Traffic flows between business groups and between containers may be stored in a database as both the relationship between the containers themselves and the relationship between the source container and the members of the destination container (e.g. for traffic between CA and FL the database may store relationships between CA and FL, between CA and MIA, TPA and ORL, and so on). A management console may be configured to display data flows between individual BGs in the form of a visual (e.g., graphical) network. In addition, a management console may be utilized to display derived flows between business group containers.

If a user wishes to graphically view network traffic for a particular business group a network topology navigation tool may be provided to interrogate the database storing relationships between business groups and to retrieve network traffic (e.g., data flow) information for the particular business group. However, when a request is made to the network monitor to retrieve business groups connected to a selected business group, an interrogation of the database may return all business groups and containers that have network traffic with the selected business group regardless of their position in the hierarchy, which may include information redundant or not directly relevant to the user's request. A more intelligent network topology navigation tool may be configured to retrieve only such database entries that are relevant to the selected business group and the selected hierarchy level and, at the same time, to enable the user to access more detailed connection information (e.g., connections to individual members of relevant business groups) by moving down through the hierarchy (i.e., through appropriate drill-downs).

FIG. 1A shows a diagrammatic representation of an exemplary group of networked nodes connected to a network. Lines between entities are network links, which may be any mode of establishing a connection between nodes including wired and/or wireless connections. In this embodiment, a firewall 10 surrounds a geographic collection of networked nodes and separates the internal network from the external network. A network traffic monitoring device 12 is shown at the firewall. However, as will be apparent to one skilled in the art, the network traffic monitoring device 12 may be located within the internal network, or on the external network or anywhere that allows the method of the present invention to be practiced. Note, entity 12 need not be "inline." That is, traffic need not necessarily pass through entity 12 in order to pass from the server to the client and vice versa. The entity 12 can be a passive monitoring device, e.g., spanning a switch or router, whereby all the traffic is copied to a switch span port which passes traffic to entity 12.

As shown in FIG. 1A, a modern network may include multiple logical groups (e.g., business groups BG1 and BG2) of nodes. Logical groups may be business groups, computers performing the same function, computers located within the same building, or any other logical groupings. FIG. 1A shows one simple organization of a small number of computers and other network nodes, but those skilled in the art will appreciate that the number of computers and network nodes may be significantly larger as can the number of connections between them. In FIG. 1A, BG1 contains several internal network nodes N101, N102, N103, and N104 and external nodes N105, N106 and N107. Similarly, BG2 contains several internal network nodes N201, N202, N203, N204, N205, N206. A network node may be any computer or device on the network that communicates with other computers or devices on the network.

Each node may function as a client, server, or both. For example, node N103, is shown as a database which is connected to Node N104, a web application server, via a network link 2. In this configuration, it is typical for node N104 to function as a client of node 103 by requesting database results. However N104 is also depicted as connected to the external network via network link 28. In this configuration, it is typical for N104 to function as a server, which returns results in response to requests from the external network. Similarly, database node N103, which functions as a server to N104, is shown connected to node N107 via a network link 4. N107 may upload information to the database via link 4, whereby N107 is functioning as a server and N103 is functioning as a client. However, N107 is also shown connected to the external network via link 26. This link could indicate that N107 is browsing the Internet and functioning as a client.

Furthermore, network nodes need not be within the internal network in order to belong to a logical group. For example, traveling employees may connect to the logical group network via a Virtual Private Network (VPN) or via ordinary network transport protocols through an external network such as the Internet. As shown in FIG. 1A, network nodes N105, N106, N107 belong to logical group BG1, but are outside the firewall, and may be geographically distant from the other network nodes in BG1. Similarly, network nodes N207, N208, N209, N210, N211 are members of logical group BG2, but are physically removed from the other members of BG2. It is important to note that the firewall in this configuration is for illustrative purposes only and is not a required element in networks where the present invention may be practiced. The separation between internal and external nodes of a network may also be formed by geographic distance, or by networking paths (that may be disparate or require many hops for the nodes to connect to one another regardless of the geographic proximity).

Figure 1B:
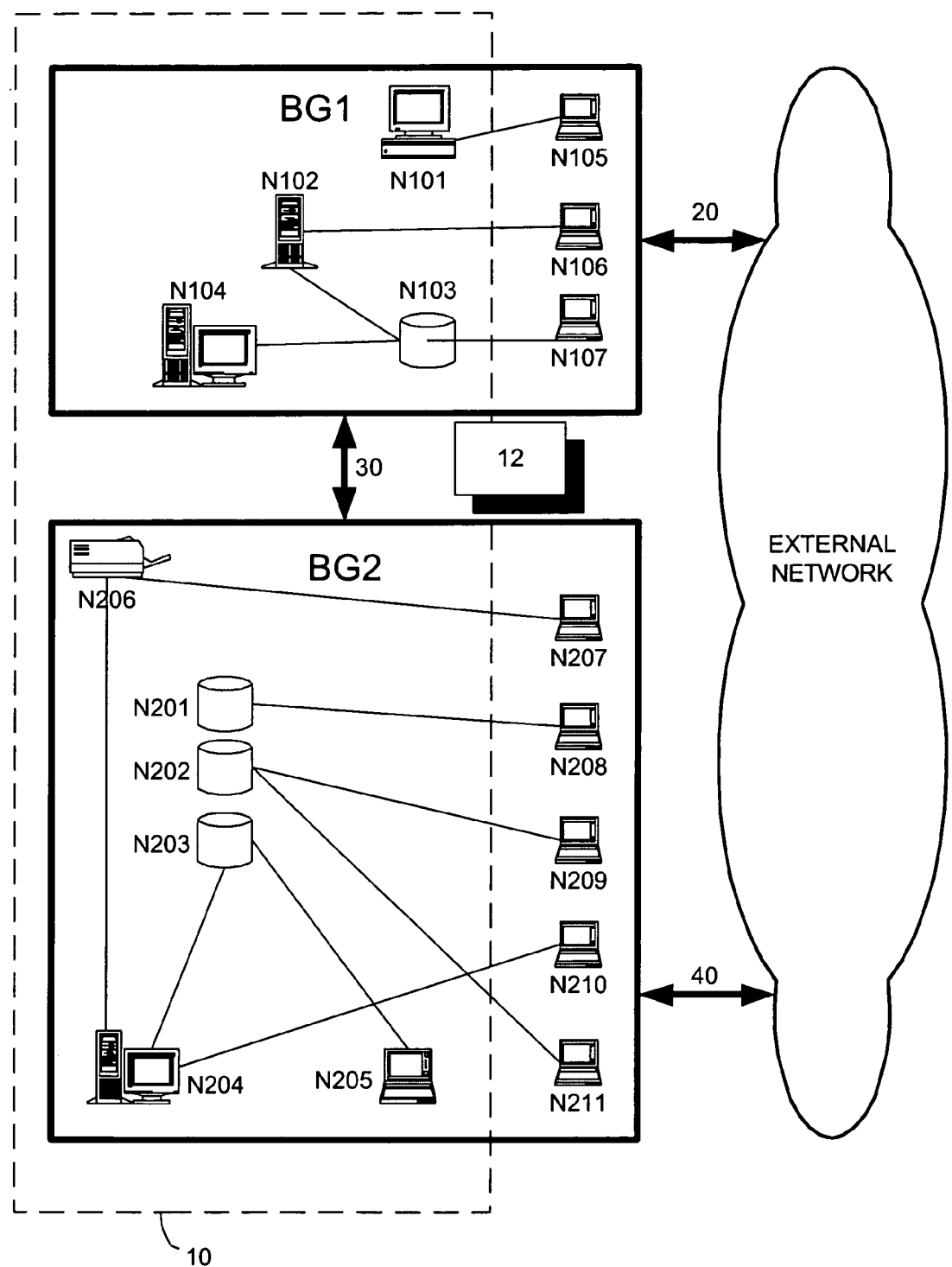

FIG. 1B shows a diagrammatic representation of network links between logical groups BG1, BG2 and the external network. While in FIG. 1A, nodes N101, N104, N105, and N107 are depicted as connected to the external network via network links 22, 24, 26, and 28, in FIG. 1B, the traffic over multiple links 22, 24, 26, 28 to the external network is condensed into one virtual link containing all inbound and outbound traffic 20 between the logical group BG1 and the external network. A similar condensation of network traffic is depicted in the views of BG2 in FIG. 1A and in FIG. 1B. In FIG. 1A, six links 42, 43, 45, 46, 47, 48 between the external network and the logical group BG2 are depicted. In FIG. 1B, all links between BG2 and the external network are condensed into one virtual link 40 over which the aggregate traffic network metrics for the logical group may be viewed. FIG. 1B also shows the condensation of multiple links 32, 34, 36 between logical groups BG1, BG2 into one virtual link 30 over which aggregate network traffic between logical groups may be viewed and analyzed.

In some embodiments, the total network traffic data may be presented by protocol, by port, by application, or by member-connected IP address per logical group. In this latter case, the total network traffic data is presented, for each logical group, by any or all of a logical group member IP address, a logical group connected IP address, a logical group member and then a logical group connected IP address, and a logical group connected and then a logical group member IP address. In still further embodiments, the total network traffic data may be presented by member-connected IP address per logical application sub-group, by member-connected IP address per logical group-to-group connection, by member-connected IP address per logical application group-to-group connection, by member-connected IP address per logical port sub-group, in a role-based fashion for the IP addresses, and/or from a standpoint of a common reference point.

Figure 2:
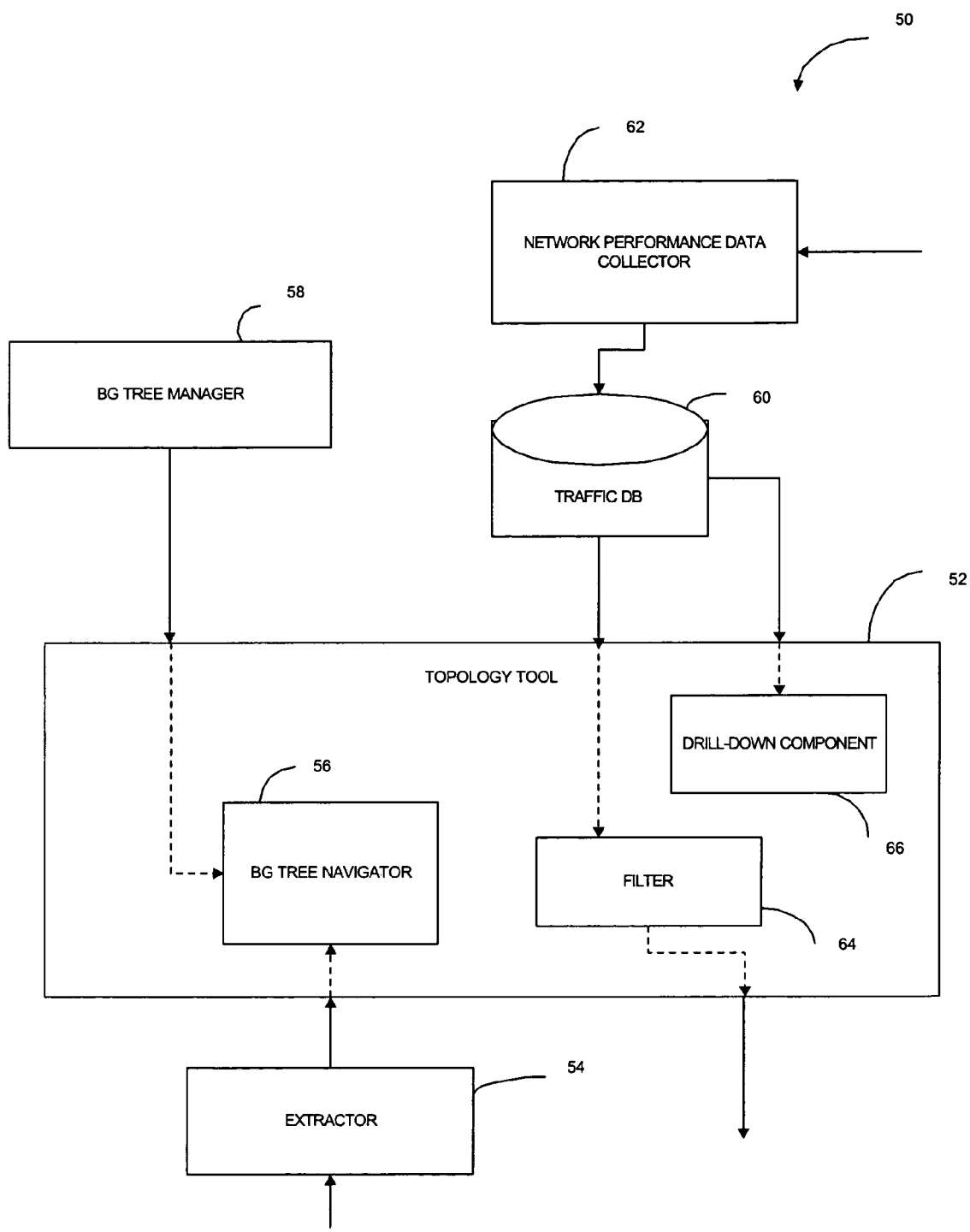
FIG. 2 shows a block diagram of a system to graphically navigate hierarchical data networks, according to one exemplary embodiment of the present invention.

Network traffic data and topology for logical groups such as, for example, business groups illustrated in FIGS. 1A and 1B, may be presented to a user graphically. FIG. 2 shows block diagram of a system 50 to graphically navigate hierarchical data groups, according to one exemplary embodiment of the present invention. A topology tool 52 of the system 50 enables a network management console to display data flows between business groups of network nodes (BGs) in the form of a visual network. The topology tool 52 receives user selection of one or more business groups (i.e., a selection of graphical representation of one or more business groups) via an extractor 54. The topology tool 52 may provide a tree navigator 56, which allows the user to graphically navigate a BG container hierarchy in order select graphical representation of one or more business groups of interest. It will be noted that a selected BG may be a BG having one or more members (which may be referred to as a BG container), no members (which may be referred to as a leaf node), or being itself a member of another BG container. The graphical representation of BG container hierarchy that is presented to the user may be obtained from a business group tree manager 58. The topology tool 52 may access network performance data for BGs in the BG container hierarchy stored in a network traffic database 60. The entries in the network traffic database 60 are created utilizing a network performance collector 62 (e.g., a network monitoring device such as the network traffic monitoring device 12 of FIGS. 1A-1B). The system 50 may be, in one embodiment, a stand-alone device, a software application, or it may be incorporated into a network management console responsible for a variety of tasks related to network monitoring.

When a user selects graphical representation of one or more BGs in the hierarchy (e.g., using a cursor control operation through a graphical user interface such as discussed below to highlight the BG of interest), the topology tool 52 accesses the network traffic database 60 to identify BGs connected to the selected BGs and utilizes a filter 64 to retrieve only such BGs that are relevant pursuant to predetermined rules. The resulting visual network displayed on the user may include traffic flows indicators as well as any of the metrics available via the network management console, e.g., throughput data for some or all pairs of connected BGs.

In one exemplary embodiment, the topology tool 52 filters connected groups according to the following rules:

1) If a BG shares a common parent with the selected BG and is at the same level in the hierarchy as the selected BG, the BG is displayed by the topology tool 52, otherwise it is not displayed. If there is any traffic between these groups, they will be linked in the visual network topology presented to the user.

2) If a connected BG does not share a common parent with the selected BG, then its top-level parent BG (its top-level container) is displayed. If there is any traffic between any of the displayed groups and any children of the top-level group, then they will be linked to the top-level group in the visual network topology.

3) If a connected BG is not a member of any BG container, then it is displayed. If there is any traffic between the BG and other displayed BGs, then the BG will be shown as connected to the other BGs in the visual network topology.

Thus, the topology tool 52 utilizes the filter 64 such that only BGs that are determined to be relevant to the user's selection are displayed. The traffic flows between the selected groups and other BGs in the hierarchy may be automatically discovered by the topology tool 52 from the network traffic database 60 entries. The user can also turn the auto-discover feature off, in which case only the selected BGs and traffic flows between the selected BGs are shown.

The system 50 may further include a drill-down component 66 to enable a user to view more detailed information related a particular BG (e.g. the members of a BG). In one embodiment, the drill-down component 66 may be provided by the topology tool 52. The user can drill-down on any displayed BG (e.g., by double-clicking on a BG of interest or by selecting a menu option from a right-click popup menu), which causes the BGs in the next level down in the hierarchy to be displayed along with the BGs that they have traffic with.

Figure 3:
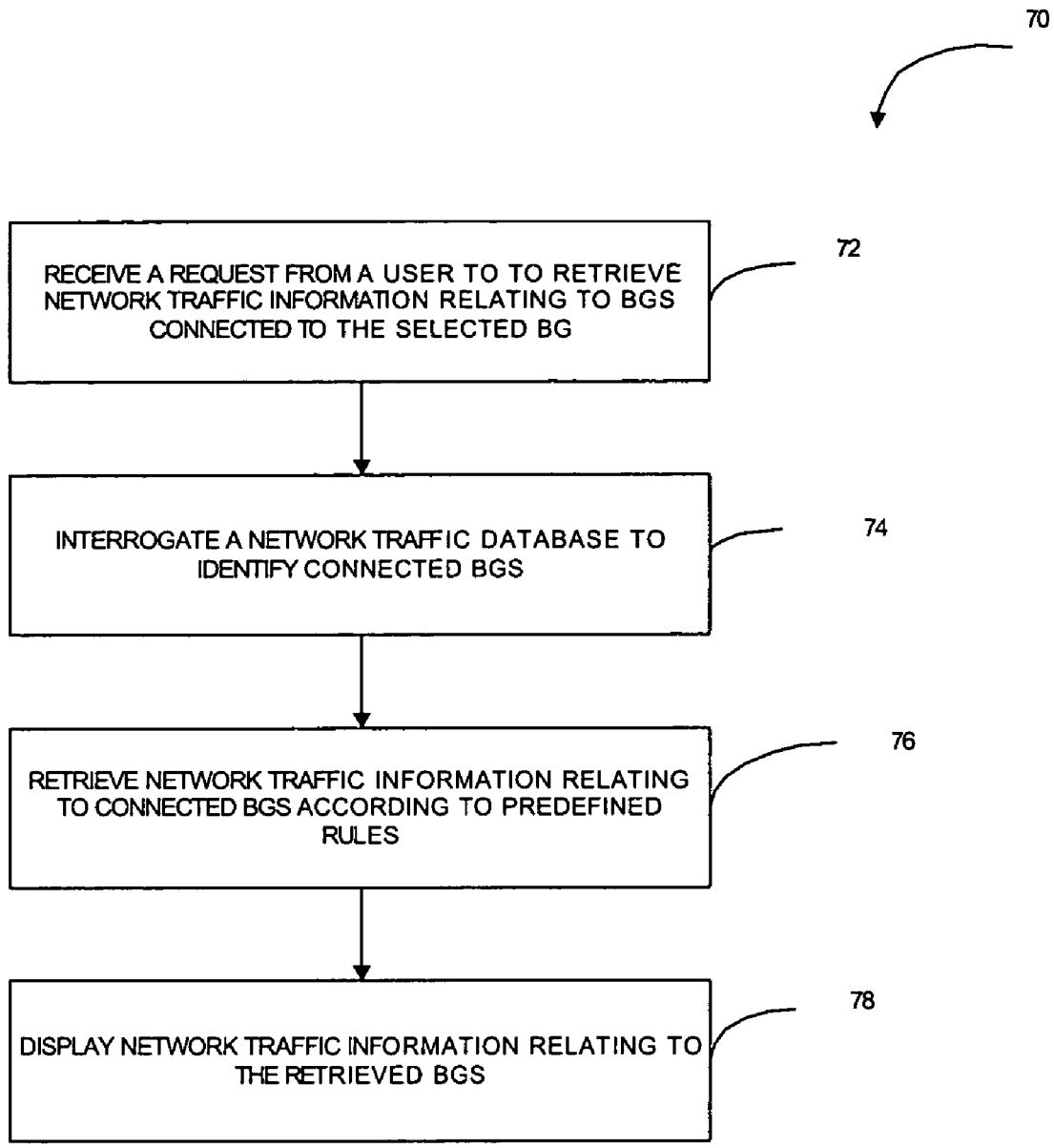
FIG. 3 is a flowchart illustrating operations performed to graphically navigate hierarchical data groups in accordance with an embodiment of the present invention.

FIG. 3 shows a flowchart illustrating method 70 to graphically navigate hierarchical data groups, according to one exemplary embodiment of the present invention. At operation 72, the topology tool 52 receives a request from a user to retrieve network traffic information related to connected business groups, containers, or nodes that are relevant to one or more selected business groups. It will be noted, that because a business group may be a member of a container having a higher level of hierarchy and at the same time itself contain members having a lower level of hierarchy, a reference to a business group includes a reference to a container. At operation 74, the topology tool 52 interrogates the traffic database and retrieves network traffic information relating to connected business groups according to predefined rules at operation 76. The predetermined rules may include, for example, the rules described with reference to FIG. 3, where the topology tool 52 graphically shows only BG containers at the selected level of the hierarchy. The topology tool 52 displays network traffic information for the retrieved BGs to the user at operation 78, as shown in FIGS. 4A-4D.

FIGS. 4A-4D illustrate a network performance management console 90 to graphically navigate hierarchical business groups, according to one embodiment of the present invention. In FIGS. 4A-4D, the user interface includes a business group (BG) hierarchy area 92, a graphical navigation area 94, a topology drawing area 96, and a tabular representation area 98. A user is permitted to explore a business group container hierarchy within the BG hierarchy area 92 and select one or more BGs. Responsive to a user selection and a command to convey to the system 50 that the user is seeking network performance information regarding the selected BGs, the user is permitted to graphically navigate the selected portions of the hierarchy displayed within the graphical navigation area 94. The user may also be presented with a topology drawing of the connections for the selected BGs in the topology drawing area 96. In addition to the graphical representation of the network topology and performance data, a user may also be provided with a tabular representation of the network traffic data for the selected BGs in the tabular representation area 98.

Referring to FIG. 4A, when a user selects "US" BG container in the BG hierarchy area 92 and activates a "Go" control button 100, the topology tool 52 displays "US" container connected to "Europe." "Europe" container is at the same level of hierarchy as "US." The topology tool 52 also displays a connection between "US" and "Other Group" in the graphical navigation area 94. "Other Group" itself is not a member of any BG container and, in one embodiment, is displayed regardless of its level of hierarchy. In this example, an auto discover control 102 is engaged (e.g., a corresponding checkbox is checked), which instructs the topology tool 52 to display BGs connected to the selected BG (here, a container), rather than displaying the selected BGs only.

As shown in FIG. 4A, a user is presented graphically with connections to the selected BG, "US." A user may wish to further explore the connections within one of the displayed containers. For example, a user may wish to see which members of the "Europe" container are connected to "US" container. In one embodiment of the present invention, a user may be permitted to drill down to one or more displayed BG containers in order to view a more detailed graphical representation of the visual network topology. Furthermore, a user may be permitted to select an appropriate drilldown mode from several illustrative drilldown modes provided by the drilldown component 66 of the topology tool 52. Some of the exemplary drilldown modes are described below.

Member discovery: in this drilldown mode, when a user selects a BG container for drilldown, all the direct members of the selected BG container are discovered and each member of the selected BG container is displayed and as a node in the graphical navigation area 94. If any of these discovered members have network traffic between them, then the links and the traffic between such nodes are discovered and displayed. The member discovery drilldown mode may be utilized when a user wishes to "zoom" into a visual representation of a particular BG container in order to view and understand interconnectivity between its members.

Member discovery drilldown mode is illustrated in FIG. 4B. In particular, FIG. 4B shows graphical representation of network topology presented to the user when the user drills down into "Europe" container utilizing the member discovery mode. As shown in FIG. 4B, when "Europe" is expanded, individual members of "Europe" (here, "FR," "IT," "UK," and "DE") are graphically presented to the user. In the member discovery drilldown mode, the user is also shown a graphical representation of links between "UK" and "IT," and "IT" and "FR." A request to drill down may be made by a user by, for example, clicking or double clicking on the container or BG of interest (which may be designated to correspond to a default drilldown mode) or by selecting a drilldown mode from a pull-down menu 104 or a hover menu that may be presented to the user (e.g., responsive to a right click by the user).

Full member to connected groups discovery: in this mode, when a user selects a BG container for drilldown, all the direct members of the selected BG container are discovered and each member of the selected BG container is displayed and as a node in the graphical navigation area 94 together with the links between them, similar to the member discovery mode. In addition, if any of these discovered members have network traffic between them and any of the other nodes that are not members of the selected BG container, then the links and the traffic between such nodes are discovered and displayed. These other nodes may include any of the nodes displayed in the original topology (i.e. prior to the drilldown action), as well as additional nodes that were not displayed in the original topology but have traffic to the member nodes of the selected BG container. The additional nodes, in one embodiment, are either top level BG containers or leaf nodes. This drilldown mode may be utilized when a user wishes to "zoom" into a visual representation of a particular BG container as well as "zoom" into the links between the selected BG container and any of its connected BGs. In one embodiment of the present invention, this is the broadest form of drilldown link discovery.

The full member to connected groups discovery mode is illustrated in FIG. 4C. In FIG. 4C, a drilldown into "Europe" presents the user not only with the members of "Europe" and the connection between the members, but also with connections between members of "Europe" and any other BGs or BG containers outside of "Europe. For example, this drilldown mode allows the user to see that "IT" and "DE" both have network traffic with "Asia." In addition to the full member to connected groups discovery mode, the drilldown component 66 of the topology tool 52 may provide a limited member to connected groups discovery mode.

Limited member to connected groups discovery: in this mode, all the members of the selected BG container are discovered. However, only those member BGs are displayed in graphical navigation area 94 that have network traffic with any of the originally displayed nodes. The links between the selected BG container and the other displayed nodes are replaced with links between the members of the selected BG container and those same other displayed nodes where there is network traffic between the nodes. In this mode, any links between the members of the selected BG container and BGs that were not originally displayed in graphical navigation area 94 are not presented to the user. For example, in this mode, the connection between "DE" and "Asia" is not displayed. The user is permitted to drilldown into the link to a particular BG container, e.g., the link between "US" and "Europe," to discover how much of the traffic between "US" and "Europe" is, for example, from traffic between "UK" and "US." Thus, although, as illustrated in FIG. 4C, "Europe" container has traffic with "Asia," the user may be only interested in understanding more about the link between "US" and "Europe," and therefore no links to Asia is shown in this mode.

FIG. 4D illustrates the limited member to connected groups discovery drilldown mode. In FIG. 4D, the user selected "US" in the BG hierarchy area 92 and requested a limited discovery drilldown on "Europe." As a result, the user is presented only with connections between the members of "Europe" and the originally selected "US" container.

Figure 5:
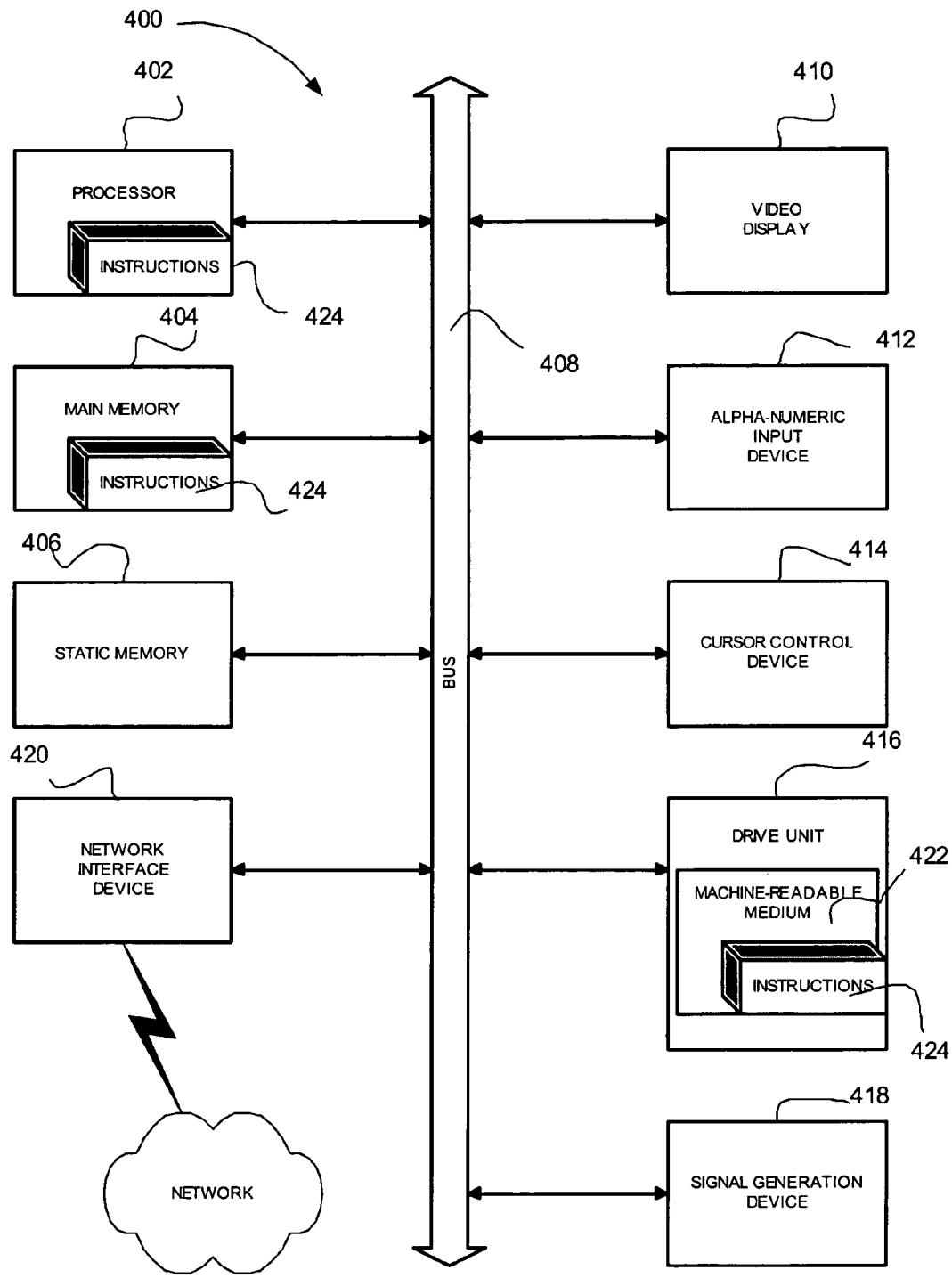
FIG. 5 shows a diagrammatic representation of a machine in the exemplary form of a computer system within which a set of instructions for causing the machine to perform a program configured in accordance with an embodiment of the present invention may be executed.

FIG. 5 shows a diagrammatic representation of a machine in the exemplary form of a computer system 400 within which a set of instructions, for causing the machine to perform a program configured in accordance with an embodiment of the present invention. In alternative embodiments, the machine operates as a standalone device or may be connected (e.g., networked) to other machines, in which case it may be a node in the network. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable or executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processor 402 (e.g., a central processing unit (CPU) a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions (e.g., software) 424 embodying any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media. The software 424 may further be transmitted or received over a network 426 via the network interface device 420.

While the machine-readable medium 422 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to graphically navigate hierarchical data groups have been described. Although the present invention has been described with reference to specific exemplary embodiments, it will be evident that various modifications and changes may be made to these embodiments without departing from the broader spirit and scope of the invention. Accordingly, the true scope of the present invention should be measured only in terms of the claims, which now follow.

What is claimed is:

1. A system to visually navigate hierarchical data groups, the system including:
    a network management console comprising,
        an extractor processing subsystem configured to receive a request to retrieve network traffic information relating to logical groups of network nodes connected to a selected logical group of such nodes having a selected level of hierarchy and
        a topology tool processing subsystem configured to retrieve information from those ones of the connected logical groups relevant to the selected level of hierarchy wherein the topology tool processing subsystem is further configured to,
            filter the connected logical groups according to respective levels of hierarchy thereof, wherein the topological tool processing subsystem includes a filter configured to,
                identify the selected logical group as a relevant logical group;
                identify those of the connected logical groups as relevant logical groups if a logical group container associated with a connected logical group of interest is the same as a logical group container associated with the selected logical group and a level of hierarchy for the connected logical group of interest is the same as the level of hierarchy for the selected logical group;
                identify a top level container for the connected logical group of interest as a relevant logical group if the logical group container associated with the connected logical group of interest is different from the logical group container associated with the selected logical group, and
                identify those of the connected logical groups as relevant logical groups if a connected logical group is not a member of any logical group container.

2. The system of claim 1, wherein a first one of the connected logical groups is characterized by a plurality of IP addresses.

3. The system of claim 2, wherein the plurality of IP addresses includes one or more ranges of IP addresses.

4. The system of claim 1, wherein a first one of the connected logical groups is a logical group container including one or more logical groups of network nodes.

5. The system of claim 1, further including a tree navigator configured to present a user with a representation of a hierarchy of the logical groups of network nodes.

6. The system of claim 1, wherein the topology tool further configured to:
    automatically discover the connected logical groups.

7. The system of claim 6, further including a traffic flow database configured to store the network traffic information for the connected logical groups.

8. The system of claim 1, wherein the topology tool is further configured to display graphically the relevant logical groups and network traffic flows between the selected logical group and the relevant logical groups.

9. The system of claim 8, wherein the topology tool is further configured to display one or more objects included in a target logical group from the displayed logical groups, responsive to a cursor control operation associated with the displayed logical group.

10. The system of claim 8, wherein the topology tool further includes a drilldown component to:
    receive a request for a drilldown associated with a target logical group;
    display drilldown data for the target logical group according to a drilldown mode.

11. The system of claim 10, wherein:
    the drilldown mode is a first drilldown mode; and
    the drilldown data includes graphical representation of members of the target logical group, and graphical representation of connections between the members of the target logical group.

12. The system of claim 10, wherein:
    the drilldown mode is a second drilldown mode; and
    the drilldown data includes graphical representation of members of the target logical group, graphical representation of connections between the members of the target logical group, graphical representation of connections between the members of the target logical group and the displayed logical groups, and graphical representation of connections between the members of the target logical group and other logical groups.

13. The system of claim 10, wherein:
    the drilldown mode is a third drilldown mode; and
    the drilldown data includes graphical representation of only such members of the target logical group that have network traffic with the displayed logical groups, graphical representation of connections between the displayed logical groups that are not the target logical group, and graphical representation of connections between such members and the displayed logical groups.

14. A method to visually navigate hierarchical data groups, the method including:
    receiving at a computer system a request to retrieve network traffic information associated with logical groups of network nodes connected to a selected logical group of such nodes having a selected level of hierarchy; and
    retrieving such information for those of the connected logical groups relevant to the selected level of hierarchy, wherein the retrieving includes,
        filtering the logical groups so connected according to respective levels of hierarchy thereof, wherein the filtering includes,
            identifying the selected logical group as a relevant logical group,
            identifying those of the connected logical groups as relevant logical groups if a logical group container associated with a connected logical group of interest is the same as a logical group container associated with the selected logical group and a level of hierarchy for the connected logical group of interest is the same as the level of hierarchy for the selected logical group, identifying a top level container for the connected logical group of interest as a relevant logical group if the logical group container associated with the connected logical group of interest is different from the logical group container associated with the selected logical group, and identifying those of the connected logical groups as relevant logical groups if a connected logical group is not a member of any logical group container.

15. The method of claim 14, wherein a first logical group from the connected logical groups is characterized by a plurality of IP addresses.

16. The method of claim 15, wherein the plurality of IP addresses includes one or more ranges of IP addresses.

17. The method of claim 14, wherein the first one of the connected logical groups is a logical group container including one or more logical groups of network nodes.

18. The method of claim 14, wherein the receiving of the request includes presenting a user with a representation of a hierarchy of logical groups of network nodes.

19. The method of claim 14, wherein the retrieving of the relevant logical groups includes:
automatically discovering logical groups connected to the selected logical groups.

20. The method of claim 19, wherein the discovering of the connected logical groups includes interrogating a traffic flow database.

21. The method of claim 14, further including displaying graphically the selected logical group, relevant logical groups, and network traffic flow between the selected logical group and the relevant logical groups.

22. The method of claim 21, further including, responsive to a cursor control operation associated with a target logical group from the displayed logical groups, displaying one or more objects included in the target logical group.

23. The method of claim 21, further including:
receiving a request for a drilldown associated with a target logical group;
displaying drilldown data for the target logical group according to a drilldown mode.

24. The method of claim 23, including:
selecting a first drill mode; and
displaying graphical representation of members of the target logical group, and graphical representation of connections between the members of the target logical group.

25. The method of claim 23, including:
selecting a second drill mode; and
displaying graphical representation of members of the target logical group, graphical representation of connections between the members of the target logical group, graphical representation of connections between the members of the target logical group and the displayed logical groups, and graphical representation of connections between the members of the target logical group and other logical groups.

26. The method of claim 23, including:
selecting a third drill mode; and
displaying graphical representation of only such members of the target logical group that have network traffic with the displayed logical groups, graphical representation of connections between the displayed logical groups that are not the target logical group, and graphical representation of connections between such members and the displayed logical groups.

27. A user interface including:
a display configured to present,
a hierarchy tree area configured to permit a user to select, using a cursor control device, a graphical representation of a logical group of network nodes having a selected level of hierarchy,
an activation control configured to permit the user to request retrieval of network traffic information for logical groups of such nodes connected to the selected logical group, wherein the retrieving includes,
filtering the logical groups so connected according to respective levels of hierarchy thereof, wherein the filtering includes, identifying the selected logical group as a relevant logical group,
identifying those of the connected logical groups as relevant logical groups if a logical group container associated with a connected logical group of interest is the same as a logical group container associated with the selected logical group and a level of hierarchy for the connected logical group of interest is the same as the level of hierarchy for the selected logical group,
identifying a top level container for the connected logical group of interest as a relevant logical group if the logical group container associated with the connected logical group of interest is different from the logical group container associated with the selected logical group, and
identifying those of the connected logical groups as relevant logical groups if a connected logical group is not a member of any logical group container, and
a graphical navigation area configured to display graphical representation of those of the connected logical groups relevant to the selected level of hierarchy.

28. The user interface of claim 27 wherein the graphical navigation area is further configured to display members of those of the logical groups responsive to a cursor control operation by the user.

29. A machine-readable storage medium having stored thereon data representing sets of instructions which, when executed by a machine, cause the machine to:
receive a request network traffic information relating to logical groups of network nodes connected to a selected logical group of such nodes having a selected level of hierarchy; and
retrieve information from those ones of the connected logical groups relevant to the selected level of hierarchy, wherein the retrieving further causes the machine to,
filter the logical groups so connected according to respective levels of hierarchy thereof, wherein the filtering further causes the machine to,
identify the selected logical group as a relevant logical group,
identify those of the connected logical groups as relevant logical groups if a logical group container associated with a connected logical group of interest is the same as a logical group container associated with the selected logical group and a level of hierarchy for the connected logical group of interest is the same as the level of hierarchy for the selected logical group, identify a top level container for the connected logical group of interest as a relevant logical group if the logical group container associated with the connected logical group of interest is different from the logical group container associated with the selected logical group, and identify those of the connected logical groups as relevant logical groups if a connected logical group is not a member of any logical group container.

30. An apparatus including:

means for receiving at a computer system a request to retrieve network traffic information associated with logical groups of network nodes connected to a selected logical group of such nodes having a selected level of hierarchy, wherein said means for receiving includes memory; and means for retrieving such information for those of the connected logical groups relevant to the selected level of hierarchy, wherein the retrieving means further includes, means for filtering the logical groups so connected according to respective levels of hierarchy thereof, wherein the filtering means further includes, first identifying means for identifying the selected logical group as a relevant logical group, second identifying means for identifying those of the connected logical groups as relevant logical groups if a logical group container associated with a connected logical group of interest is the same as a logical group container associated with the selected logical group and a level of hierarchy for the connected logical group of interest is the same as the level of hierarchy for the selected logical group, third identifying means for identifying a top level container for the connected logical group of interest as a relevant logical group if the logical group container associated with the connected logical group of interest is different from the logical group container associated with the selected logical group, and fourth identifying means for identifying those of the connected logical groups as relevant logical groups if a connected logical group is not a member of any logical group container.

* * * * *